(No Model.)

W. V. ASH.
TREADLE CRANK FOR BICYCLES.

No. 485,678. Patented Nov. 8, 1892.

WITNESSES:
W. D. Bell.
D. Robertson

INVENTOR:
Walter Voorhistah
BY Gartner & Co
ATTORNEYS

UNITED STATES PATENT OFFICE.

WALTER VOORHIS ASH, OF NEWARK, NEW JERSEY.

TREADLE-CRANK FOR BICYCLES.

SPECIFICATION forming part of Letters Patent No. 485,678, dated November 8, 1892.

Application filed July 29, 1892. Serial No. 441,558. (No model.)

*To all whom it may concern:*

Be it known that I, WALTER VOORHIS ASH, a citizen of the United States, residing in Newark, county of Essex, and State of New Jersey, have invented certain new and useful Improvements in Treadle-Cranks for Bicycles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide means for securing the treadle-crank to the axle or crank-shaft of a bicycle, simple and durable in construction, and not liable to get out of order.

The invention consists in the improved treadle-crank-fastening device for a bicycle and the combination and arrangement of the various parts thereof, substantially as will be hereinafter more fully described, and finally embodied in the clauses of the claim.

Similar letters indicate corresponding parts in each of the several figures.

Figure 1:
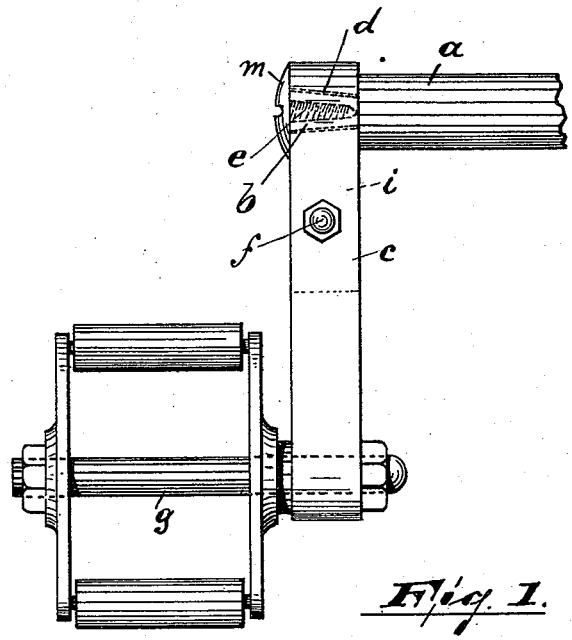
Figure 2:
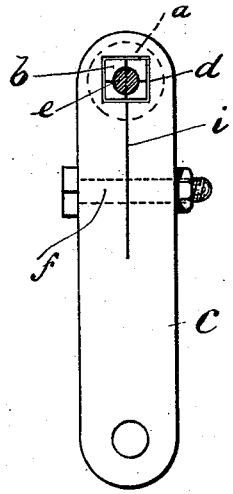
Figure 3:
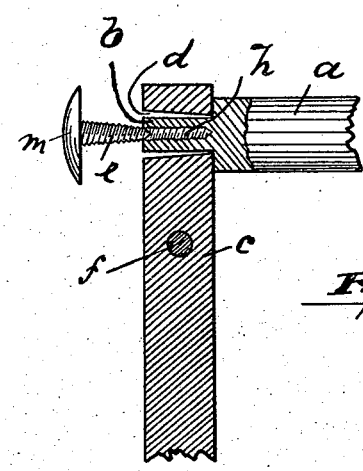

Figure 1 is a side elevation of the treadle and crank attached to a portion of the axle of a bicycle and embodying my improvement. Fig. 2 is a front elevation of Fig. 1, the treadle and the head of the fastening-screw being removed; and Fig. 3 is a detail sectional view illustrating the mode of securing the treadle-crank to the axle.

In said drawings, $a$ represents the end portion of the axle of a bicycle provided with a squared and reduced projection $b$. Said projection is again provided with an internally-threaded hole $h$, and is also split at right angles, as clearly shown in Fig. 2 of the drawings. On said projection $b$ is arranged the treadle-crank $c$, having a squared and tapered opening $d$, as illustrated in Figs. 1 and 3. Said crank is split centrally, as indicated at $i$ in Fig. 2. Below the opening $d$ is arranged a bolt $f$, adapted to securely clamp and fasten the split portions of said crank on the projection $b$ of axle $a$. To the lower end of the crank is secured the treadle $g$ in the usual manner. Into the opening $h$ is screwed a tapering screw $l$, which is provided with a head $m$ of a diameter equal to or almost equal to the width of crank $c$. To firmly secure the treadle-crank to the axle, the bolt $f$ of crank $c$ is first loosened and the latter placed with its squared opening on the projection $b$ of axle $a$. The tapering screw is then screwed into the hole $h$, whereby the four sections of the projection $b$ are spread until they entirely fill the tapered opening $d$ of the crank. The bolt $f$ is then tightened. By this improved mode of securing the treadle-crank to the axle a very strong and unyielding connection is obtained, as will be manifest.

Having thus described my invention, what I claim as new, and desire to secure by Letters Patent, is—

1. In a treadle-crank-fastening device for a bicycle, the combination, with the axle, of a squared and crosswise split projection arranged at the outer end of the axle and integral therewith, said projection being provided with an internally-threaded hole, a treadle-crank provided with a squared tapered opening and adapted to engage said projection, and a tapered screw arranged in said internally-threaded hole, all said parts substantially as described, and for the purposes set forth.

2. In a treadle-crank-fastening device for a bicycle, the combination, with the axle, of a squared and split projection integral with the axle, said projection being provided with an internally-threaded hole, a crank carrying at its lower end the treadle and at its upper end provided with a squared tapered opening, part of said crank being split longitudinally and adapted to engage with its squared tapered opening the squared projection of the axle, a screw arranged in the internally-threaded hole of said projection, and a bolt passing crosswise through the split portion of the crank, all said parts substantially as described, and for the purposes set forth.

In testimony that I claim the foregoing I have hereunto set my hand this 25th day of July, 1892.

WALTER VOORHIS ASH.

Witnesses:
ALFRED GARTNER,
CHARLES KIENERT.